(12) United States Patent
Watson et al.

(10) Patent No.: US 11,372,638 B2
(45) Date of Patent: *Jun. 28, 2022

(54) AUTOMATED DEPENDENCY DETECTION AND RESPONSE

(71) Applicant: Capital One Services, LLC, McLean, VA (US)

(72) Inventors: Mark Watson, Sedona, AZ (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,770

(22) Filed: Sep. 16, 2020

(65) Prior Publication Data

US 2021/0149667 A1 May 20, 2021

Related U.S. Application Data

(63) Continuation of application No. 16/688,749, filed on Nov. 19, 2019, now Pat. No. 10,838,716.

(51) Int. Cl.
| | |
|---|---|
| *G06F 8/71* | (2018.01) |
| *G06F 8/30* | (2018.01) |
| *G06F 11/36* | (2006.01) |
| *G06F 8/73* | (2018.01) |

(52) U.S. Cl.
CPC ............ *G06F 8/71* (2013.01); *G06F 8/30* (2013.01); *G06F 8/73* (2013.01); *G06F 11/3684* (2013.01); *G06F 11/3688* (2013.01)

(58) Field of Classification Search
CPC ........ G06F 8/60–75; G06F 11/36; G06F 8/30; G06F 8/71; G06F 8/73; G06F 11/3684; G06F 11/3688
See application file for complete search history.

(56) References Cited

U.S. PATENT DOCUMENTS

| | | |
|---|---|---|
| 5,634,114 A | 5/1997 | Shipley |
| 8,001,532 B1 | 8/2011 | Jakubiak et al. |
| 8,276,123 B1* | 9/2012 | Deng ................... G06F 11/368 717/124 |
| 10,459,697 B1 | 10/2019 | Metwally et al. |
| 2009/0077541 A1 | 3/2009 | Jeffries et al. |
| 2016/0070542 A1* | 3/2016 | Vadapandeshwara .... G06F 8/36 717/163 |

(Continued)

*Primary Examiner* — Ziaul A Chowdhury
(74) *Attorney, Agent, or Firm* — Banner & Witcoff, Ltd.

(57) ABSTRACT

Systems, methods, and apparatuses are described for analyzing differences in program dependencies, such as libraries. Code of a computer program may be dependent on a first version of a library. The first version of the library may comprise one or more first functions. Based on the first version of the library, a tree model representing the first version of the library and corresponding functions that the library comprises may be generated. A second version of the library may be determined. The one or more first functions of the first version of the library may be compared to one or more second functions of the second version of the library. The differences may be output by, e.g., displaying the differences using a modified tree model based on the generated tree model, and/or code of the program may be updated.

20 Claims, 5 Drawing Sheets

(56) References Cited

U.S. PATENT DOCUMENTS

| | | |
|---|---|---|
| 2017/0075686 A1 | 3/2017 | Ko |
| 2017/0242687 A1 | 8/2017 | Saraswati et al. |
| 2018/0046446 A1 | 2/2018 | Turovsky et al. |
| 2018/0060043 A1* | 3/2018 | Ahmad .................... G06F 8/54 |
| 2018/0081661 A1* | 3/2018 | Gonzalez del Solar ..................... G06F 16/951 |
| 2018/0121335 A1 | 5/2018 | Cillis et al. |
| 2018/0129494 A1 | 5/2018 | Odvody et al. |
| 2018/0267796 A1 | 9/2018 | Kennedy et al. |
| 2018/0365033 A1 | 12/2018 | Yu et al. |
| 2019/0073230 A1 | 3/2019 | Ruder et al. |
| 2019/0332524 A1* | 10/2019 | Jayaswal ............. G06F 11/3664 |
| 2019/0340512 A1 | 11/2019 | Vidal et al. |
| 2020/0159536 A1* | 5/2020 | Saidi ..................... G06F 9/3012 |
| 2020/0192638 A1 | 6/2020 | Pezaris |

* cited by examiner

AUTOMATED DEPENDENCY DETECTION AND RESPONSE

CROSS-REFERENCE TO RELATED APPLICATION

This application claims priority to U.S. Non-Provisional patent application Ser. No. 16/688,749, filed Nov. 19, 2019, the disclosure of which is incorporated by reference herein in its entirety and made part hereof.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to software development, and more specifically to software dependencies, program compiling, software packages, and the like.

BACKGROUND

Computer programs may have dependencies, such that those programs may depend on one or more libraries to provide one or more functions. For example, a language translation web application may rely on a series of libraries to receive input, generate a graphical user interface using which a user may provide such input, and translate an input first language into a second language. Dependencies may change over time: for example, a library created by a third party may be periodically updated by the third party to add functionality or fix bugs. Change in such dependencies may impact the functionality of software depending on those dependencies: for example, a change in a function name in a library may cause software to generate errors, operate in an unexpected manner, and/or be incapable of performing one or more functions.

Aspects described herein may address these and other problems, and generally improve the quality, efficiency, and speed of detection and response to differences in dependencies.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Program code may depend on a first version of a library, and the first version of the library may be associated with a plurality of first program functions. Execution of the program code may cause execution of one or more of the plurality of first program functions. For example, program code for a video game may be dependent on a graphics library, that graphics library may comprise functions relating to drawing graphics on a display device, and execution of the program code may cause, at some point during execution of the program code, the execution of the functions relating to drawing graphics on the display device. A tree model comprising a plurality of parent nodes and a plurality of child nodes may be generated. The parent nodes may represent libraries, whereas the child nodes underneath those parent nodes may represent one or more functions in those libraries. A second version of the library may be determined (e.g., received by a computing device). The second version of the library may be associated with a plurality of second program functions that may correspond to one or more of the plurality of first program functions. For example, the same function may be named differently in the second version of the library as compared to a corresponding function in the first version of the library. Code differences between a first program function in the plurality of first program functions and a corresponding function in the plurality of second program functions may be determined. A modified version of the tree model based on these differences may be generated and displayed. For example, the tree model may be modified in a way that indicates a determined difference with respect to one or more of the child nodes, such that a developer may easily identify a change in a particular function. The computing device may additionally and/or alternatively be configured to cause unit testing of all or portions of the program code based on the differences, and/or update (e.g., automatically update) one or more portions of the program code based on the differences.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for detecting and displaying changes in code in code dependencies. Code of a program may rely on one or more functions of one or more libraries. For example, a video game may require a graphics library with graphics output functions to provide graphical output.

Systems as described herein may include detecting and displaying differences in one or more functions of a first library and one or more functions of a second library. Program code may be determined, and that program code may depend on one or more different libraries. The libraries may change over time, such that, for example, a new version of a library may be provided for use with existing code that previously used an older version of the library. One or more first program functions of a first version of a library may be determined. A tree model may be generated based on those one or more first program functions. The tree model may be configured to display one or more parent nodes representing libraries, and one or more child nodes (with a child-parent relationship to one or more of the parent nodes) which represent one or more program functions of a corresponding library. The tree model may be configured for display by, e.g., a computing device. A second version of the library may be received. The second version of the library may comprise one or more second program functions. The one or more first program functions and the one or more second program functions may correspond to one another. For example, the functions may be named differently, require different inputs, and/or provide output differently, but may be intended for the same or a similar purpose. The one or more first program functions and the one or more second program functions may be compared to determine one or more differences. For example, a function name may have changed, input parameters may have changed, output parameters may have changed, the code used for a function may have changed, or the like. Such differences may be determined by comparing code associated with the one or more first program functions and/or the one or more second program functions. Based on the differences, a modified version of the tree model may be generated and/or displayed with one or more indications of the differences, and/or a unit test may be performed to determine one or more failures (e.g., failures associated with the differences in the libraries). Additionally and/or alternatively, program code may be updated based on the differences.

Systems and methods according to this application improve the functioning of computers by improving the detection and handling of code dependencies. It is increasingly common for libraries used by program code to be regularly updated. For example, web application libraries are regularly updated to improve the security of existing functions as security vulnerabilities are discovered. While the replacement of an existing library with a new library may be as easy as overwriting a file, the effects of that replacement may be unknown until extensive testing is performed. For example, replacing an old library with a new library may improve the security of a log-in function, but may simultaneously cause the log-in function to crash a program programmed to use the old version of the library. Testing for such errors may be unreliable and prohibitively time-consuming and expensive, especially where all possible uses of functions of a library cannot be readily predicted and tested. These difficulties sometimes result in developers continuing to use older versions of libraries, which may preserve undesirable security vulnerabilities and bugs in programs long after they have been remedied by library developers.

Moreover, in order to properly remediate errors introduced by library upgrades, information about which portions of a library cause errors may be critical to properly remediate the errors efficiently. Displaying an indication of which portions of one or more libraries has changed between two libraries (e.g., using a tree model, as described herein) may advantageously allow developers to focus on particular areas of code (e.g., particular libraries, functions) most likely responsible for errors introduced by the upgrading of a particular library.

Figure 1:
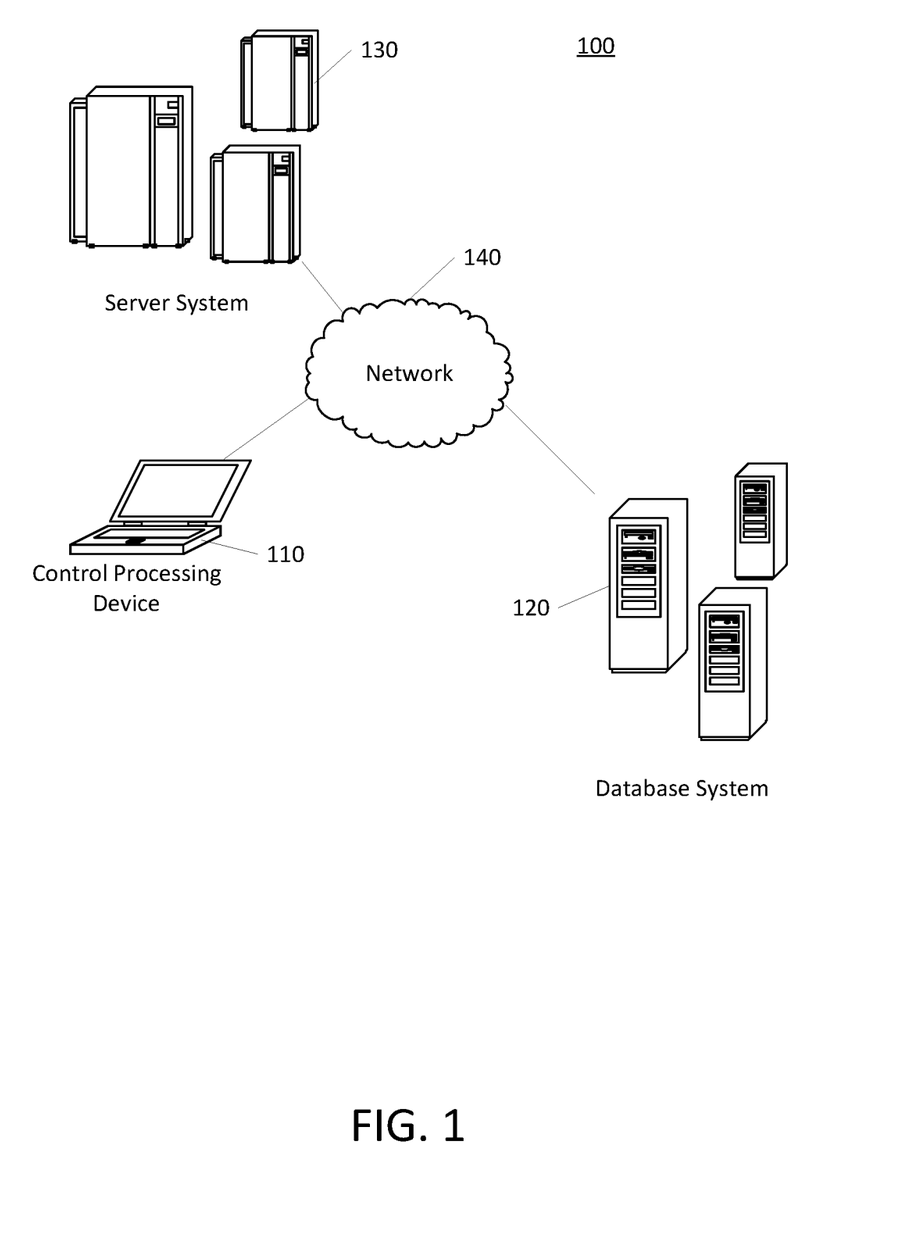
FIG. 1 shows an example of a control processing system in which one or more aspects described herein may be implemented.

FIG. 1 shows a system 100. The system 100 may include at least one control processing device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Devices, such as the control processing device 110, may generate tree models, determine differences in libraries, and other steps as described herein. Database systems 120 may similarly generate tree models, determine differences in libraries, and other steps as described herein. Databases may include, but are not limited to relational databases, hierarchical databases, distributed databases, in-memory databases, flat file databases, XML databases, NoSQL databases, graph databases, and/or a combination thereof. Server systems, such as the server system 130, may also generate tree models, determine differences in libraries, and other steps as described herein. The network 140 may include a local area network (LAN), a wide area network (WAN), a wireless telecommunications network, and/or any other communication network or combination thereof.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
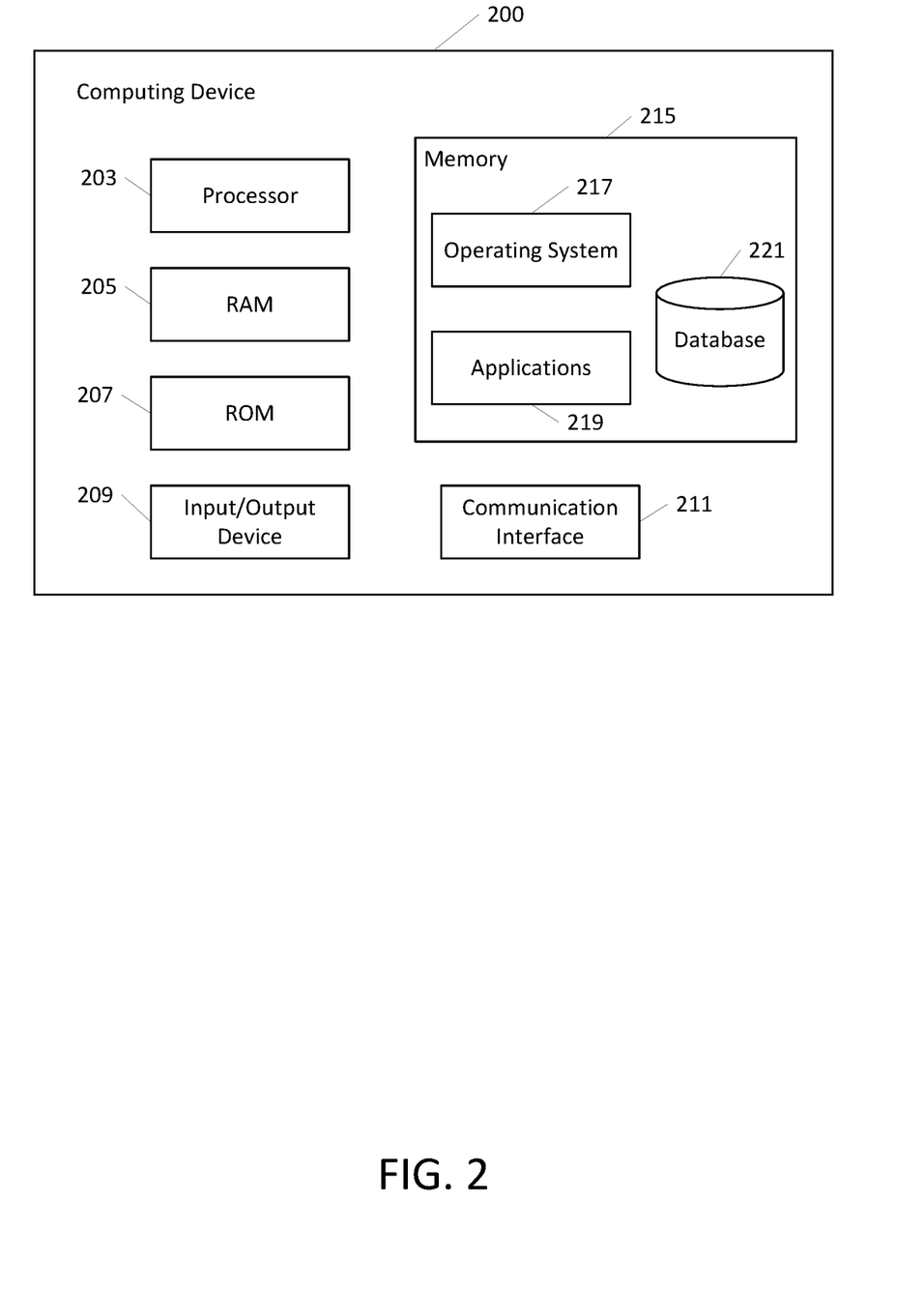
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
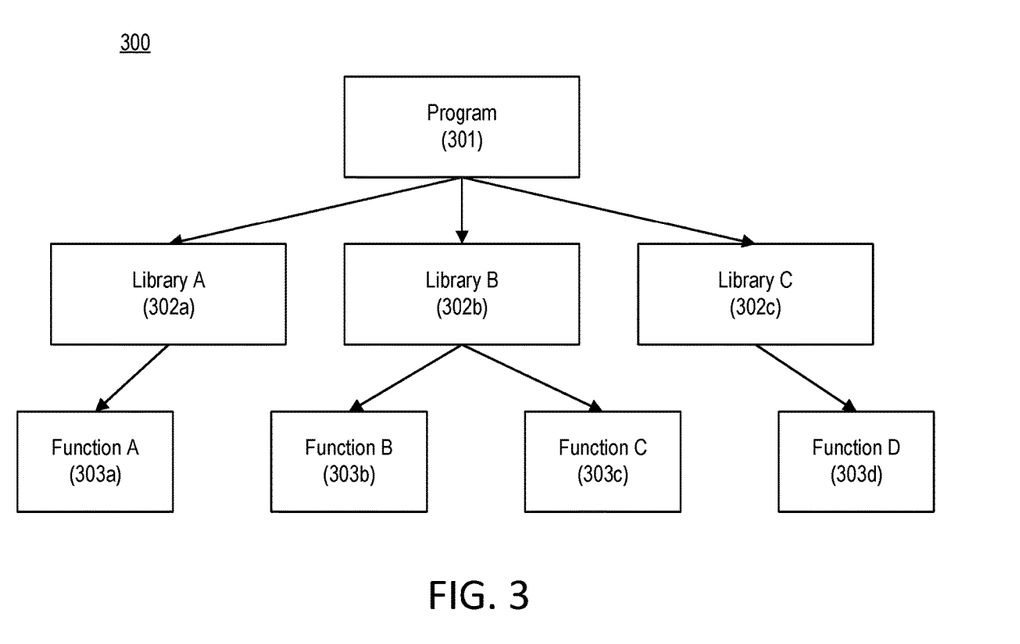
FIG. 3 shows a tree model for a program with library dependencies according to one or more aspects of the disclosure.

FIG. 3 displays a tree model 300 of a program 301. The program 301 may comprise code which may have one or more dependencies, and those dependencies may include one or more libraries 302*a*-302*c*. Each library, which may also be referred to as a library package, may comprise one or more functions 303*a*-303*d*, which may be referred to as one or more program functions. As shown in FIG. 3, library A 302*a* may comprise function A 303*a*, library B 302*b* may comprise function B 303*b* and function C 303*c*, and library C 302*c* may comprise function D 303*d*. All functions available through libraries need not be used during execution of the program 301. For example, during execution of the program 301, the program 301 may use function B 303*b* often, but might not ever use function C 303*c* or function D 303*d*.

The program 301 may be any form of computer program in any format or any language. Though FIG. 3 depicts three libraries, the program 301 may have any number or type of library dependencies. More generally, a program may have an unlimited number of dependencies, and dependencies may have their own dependencies. For example, a library (e.g., the library A 302*a*) may depend on one or more secondary libraries to provide one or more functions.

The libraries 302*a*-302*c* may comprise a collection of one or more functions which may be relied upon by the program 301. The libraries 302*a*-302*c* may additionally and/or alternatively comprise content other than functions, such as graphics, sound, or the like. The libraries 302*a*-302*c* need not be in any particular format, and a program (e.g., the program 301) may be dependent on libraries of different types and/or sizes. For example, the library A 302*a* may comprise a Lua script file such that the program 301 executes the script file using an interpreter, whereas the library B may comprise a .DLL file.

The functions 303*a*-303*d* may be any function which may be performed (e.g., code which may be executed) by one or more computing devices. For example, the function 303*a* may be configured to receive a string and output an encrypted string. As another example, the function D 303*d* may cause an input audio file to be played via an output device. Functions may call other functions, including themselves. As will be described further below, the functions 303a-303d might not be all functions associated with the libraries 302a-302c. Rather, the functions 303a-303d may be those which are associated with the program 301, such that functions made available by one or more of the libraries 302a-302c but unused by the program 301 might not be depicted or used in the tree model 300.

Figure 4:
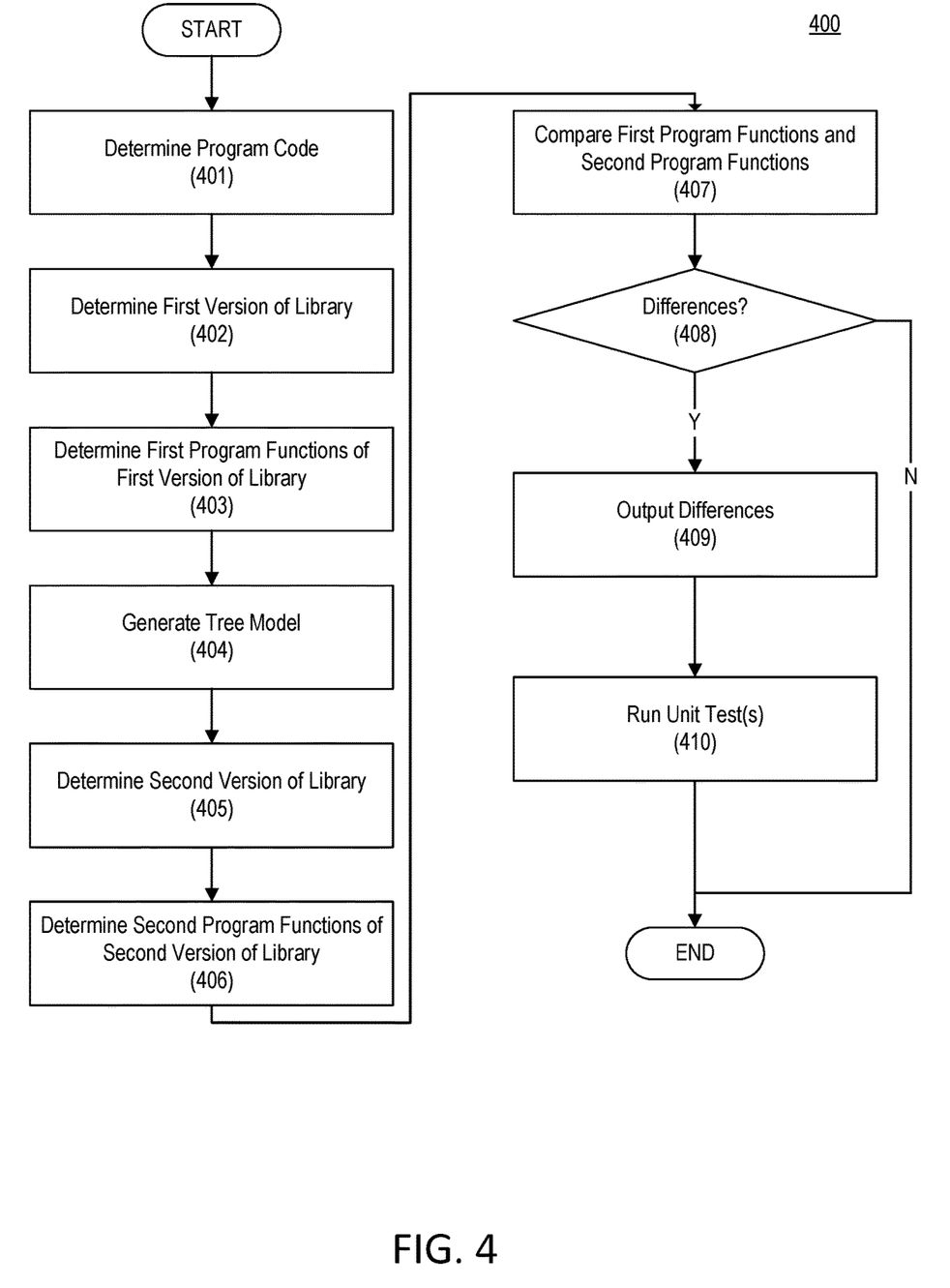
FIG. 4 shows a flow chart of a process for detecting and responding to differences in libraries according to one or more aspects of the disclosure.

A change in one or more dependencies of a program (e.g., the program 301) may impact the ability of the program to perform one or more functions. FIG. 4 shows a flow chart of a process for detecting and responding to differences in libraries according to one or more aspects of the disclosure. Some or all of the steps of process 400 may be performed using one or more computing devices as described herein.

In step 401, program code for a program (e.g., the program 301) may be determined. Such code may comprise a plurality of files, such as a plurality of different files all associated with a single program. The code need not be stored on the same or similar storage devices. For example, program code may be executed partially on a local device (e.g., a user's smartphone) and partially on a remote device (e.g., a remote server). The code need not all be in the same or similar programming languages. For example, a first portion of the program code may be in Ruby, whereas another portion of the program code may comprise instructions specific to a particular processor. As part of step 401, disparate parts of the program code may be collected together (e.g., copied to memory of a single computing device) for more convenient analysis.

In step 402, based on the program code, a first version of a library may be determined. The first version of the library may be the version of the library currently used by the program code, and/or a version of the library that was previously used by the program. The first version of the library may be associated with an identifier of the version of the library (e.g., a version number, a revision number, or the like).

In step 403, one or more first program functions of the first version of the library may be determined. As indicated in FIG. 3, the library (e.g., the library B 302b) may comprise a plurality of functions (e.g., the function B 303b and the function C 303c). Program functions may be determined for a library by parsing code of the first version of the library, parsing documentation associated with the first version of the library, logging input and output of the library to determine which activities are performed by the library, or the like.

The one or more first program functions of the first version of the library need not be all functions associated with the library. A library may provide a plurality of functions, and the process in step 403 may consider only those functions which are used by program code. For example, a library may provide fifty different functions, and program code may only use two of those functions, such that the process described in step 403 determines only the two functions. This may advantageously avoid analysis of functions which, changed or not, are not used by the program code.

In step 404, based on the one or more first program functions of the first version of the library, a tree model (e.g., a tree model the same as or similar to the tree model 300) may be generated. The tree model may be configured to show, for one or more libraries and one or more functions, a relationship between a program, its one or more libraries, and the one or more functions of those libraries. Generating the tree model may comprise generating an image of the tree model, generating data configured to, when executed by another program (e.g., a web browser), display the tree model, or the like. The tree model may be interactive, such that users may minimize or expand various portions of the tree model for easier review.

In step 405, a second version of the library may be determined. The second version of the library may be a different library, an upgraded version of the library, a rewritten version of the library, or the like. Though described as a second version of the library, the second version of the library may be completely different (e.g., programmed by a different programmer), may have a smaller file size, and/or may comprise fewer functions than the first version of the library. Additionally and/or alternatively, the second version of the library may be an entirely different library that, e.g., provides similar functions to the first version of the library. Accordingly, the first version of the library and the second version of the library may be entirely different. While the first version of the library and the second version of the library may have similarities and may be intended for the same or similar purposes, as will be described in greater detail below, they may have numerous differences as well. Determining the second version of the library may comprise receiving, from one or more computing devices, the second version of the library. For example, a computing device may be periodically configured to query a server for updates to one or more libraries, and the computing device may determine the second version of the library based on receiving, in response to the query, the second version of the library.

In step 406, one or more second program functions of the second version of the library may be determined. As will be explained further below, the one or more second program functions of the second version of the library may be similar to, but different than, the one or more first program functions of the first version of the library. Determining the one or more second program functions of the second version of the library in step 406 may be performed in a similar manner as the one or more first program functions of the first version of the library are determined in step 403. The second version of the library may be associated with an identifier of the version of the library (e.g., a version number, a revision number, or the like) different from a corresponding identifier of the first version of the library, and the difference between those identifiers may be used to determine that the second version of the library should be used. As with step 403, the one or more second program functions may be those used by program code, such that functions unused by the program code might not be determined in step 406.

In step 407, the one or more first program functions of the first version of the library and the one or more second program functions of the second version of the library may be compared. Comparing the functions in this manner may comprise comparing the code line-by-line and/or character-by-character. For example, the code in the libraries corresponding to the functions may be compared to determine differences, if any, in the code. Comparing the functions may comprise determining any changes in the name of the functions, the input variables of the functions, and/or the output variables of the functions. Any manner of other comparison methods may be used. For example, some software tools are capable of providing high-level analysis of code (e.g., code in libraries), and output from such software tools may be used to facilitate comparison. As another example, input and output of libraries may be monitored to determine how each library functions, and such information may be used to infer which functionality the libraries perform. Additionally and/or alternatively, comparisons may be performed by parsing different documentation associated with the different libraries.

In step 408, it is determined whether, based on the comparison in step 407, differences exist between the one or more first program functions of the first version of the library and the one or more second program functions of the second version of the library. If so, the flow chart proceeds to step 409. Otherwise, the flow chart ends.

Differences may be determined between the one or more first program functions of the first version of the library and the one or more second program functions of the second version of the library using a variety of different methods. All or portions of first code of the first version of the library and second code of the second version of the library may be compared (e.g., character by character, or line by line). Example input may be used to generate example output from both the one or more first program functions of the first version of the library and the one or more second program functions of the second version of the library, and the output from the functions may be compared. For example, the example input may be randomly-generated and configured to test the behavior of a known function to determine potential side effects, new functionality, or the like. Documentation associated with the first version of the library may be compared with documentation associated with the second version of the library to determine, e.g., whether function names have changed, whether functions have been added, whether input variables have changed, or the like. For example, libraries may be associated with structured descriptions of their functions (e.g., in Extensible Markup Language), and those structured descriptions may be compared.

All differences between the first version of the library and the second version of the library need not be considered. By comparing the one or more first program functions of the first version of the library and the one or more second program functions of the second version of the library, the comparison may be configured to focus on functions which may be used by the program. In this way, differences between the libraries (e.g., changes in comments to the code of one or more of the libraries) that have little to no bearing on the functioning of a program may be ignored, and the overall speed and efficiency of the comparison may be improved.

The one or more first program functions of the first version of the library and the one or more second program functions of the second version of the library may differ in that one or more function names may have changed. For example, a function previously named "drawtables( )" may be renamed to "printtables( )" This change, though minor, may impact a program's ability to call the function at all, as all code in the program may use the term "drawtables( )" (which may cease to exist if the library is updated to the second version). The detection of such a difference may indicate that all instances of the previous function name (e.g., "drawtables") should be automatically replaced with the new function name (e.g., "printtables").

The one or more first program functions of the first version of the library and the one or more second program functions of the second version of the library may differ in that one or more input variables may have changed. Particularly, changes in the quantity, type, or nature of input variables may differ. A function may take one or more input variables and, in response, provide output variables based on those input variables. For example, a first program function of the first version of the library may have a function "sum(a,b)" that may be configured to take two variables (a and b) and output the sum of the variables as a third variable, c. That function may be modified in the second version of the library to no longer take two different variables (a and b), but instead a single array of infinite length, such that the function "sum([a,b,c,d])" causes output of a variable e which is the sum of variables a, b, c, and d. Such a difference may mean that, if the program were to attempt to call the function "sum(a,b)" using the second version of the library, an error and/or unexpected behavior may occur, and that one or more portions of the program should be reprogrammed.

The one or more first program functions of the first version of the library and the one or more second program functions of the second version of the library may differ in that one or more output variables may have changed. Particularly, changes in the quantity, type, or nature of output variables may differ. For example, a first program function of the first version of the library may be configured to output a date as a string (e.g., "Jan. 1, 2020"), and a corresponding function of the second version of the library may be configured to output the date in the Coordinated Universal Time format. Such a difference may mean that outputs in various portions of the code of the program may not be as expected when the second version of the library is used, which may cause errors and/or unexpected behavior by the program.

The one or more first program functions of the first version of the library and the one or more second program functions of the second version of the library may differ in that files used by and/or contained by the library may be different. Libraries may comprise files (e.g., comprising code, multimedia, or the like), and changes in those files may cause unexpected behavior and/or errors. For example, the first version of the library may contain an image with a first dimension, and the second version of the library may contain a second image with a second dimension twice that of the first dimension, such that the program may, when using the second version of the library instead of the first version of the library, display an image larger than intended.

The one or more first program functions of the first version of the library and the one or more second program functions of the second version of the library may differ in that library files containing the library may change. For example, the first version of the library may be contained in a file called "library1.DLL," whereas the second version of the library may be contained in a file called "alllibraries.DLL." Such changes may prevent a program from locating the library (e.g., because the code attempts to import "library1.DLL" instead of "alllibraries.DLL"), which may cause unexpected behavior and/or errors.

The one or more first program functions of the first version of the library and the one or more second program functions of the second version of the library may differ in that the code used in the one or more second program functions may be different than the code used in the one or more first program functions. One or more functions may be reprogrammed over time for various reasons, such as to improve function speed, security, accuracy, or the like. Though such changes may be designed to improve a function, the changes may cause unexpected behavior and/or errors for a program. As such, even differences which suggest improvements to a function may require modification of program code.

In step 409, if differences were found in step 408, the differences may be output. Differences may be output by displaying a modified version of a previously generated tree model (e.g., the tree model 300) that indicates changes to one or more functions. For example, the modified tree model may highlight nodes that have changed. An example of such a modified tree model is discussed below with respect to FIG. 5. Outputting the differences may comprise outputting, e.g., in a message, indications of the one or more differences to developers.

Outputting the one or more differences may comprise causing a computing device to update, based on the differences, one or more portions of the program. For example, if a difference indicates that a function name has changed, then the code may be readily updated (e.g., using a find-and-replace script) to update the old function name to the new function name.

In step 410, one or more unit tests may be run based on the differences. A unit test may be used to test one or more portions of code of a program to, e.g., ascertain possible errors with respect to the code. Differences between the first version of the library and the second version of the library may indicate one or more portions of program code which may be affected. Based on such differences, one or more unit tests may be generated and run to determine one or more portions of the code of the program which may fail. Based on these tests, a notification may be transmitted (e.g., to one or more developers of the program). In this manner, unit tests need not be run on the entirety of the code of the program, but may instead be focused on one or more portions of the code of the program based on the differences determined in step 408.

Figure 5:
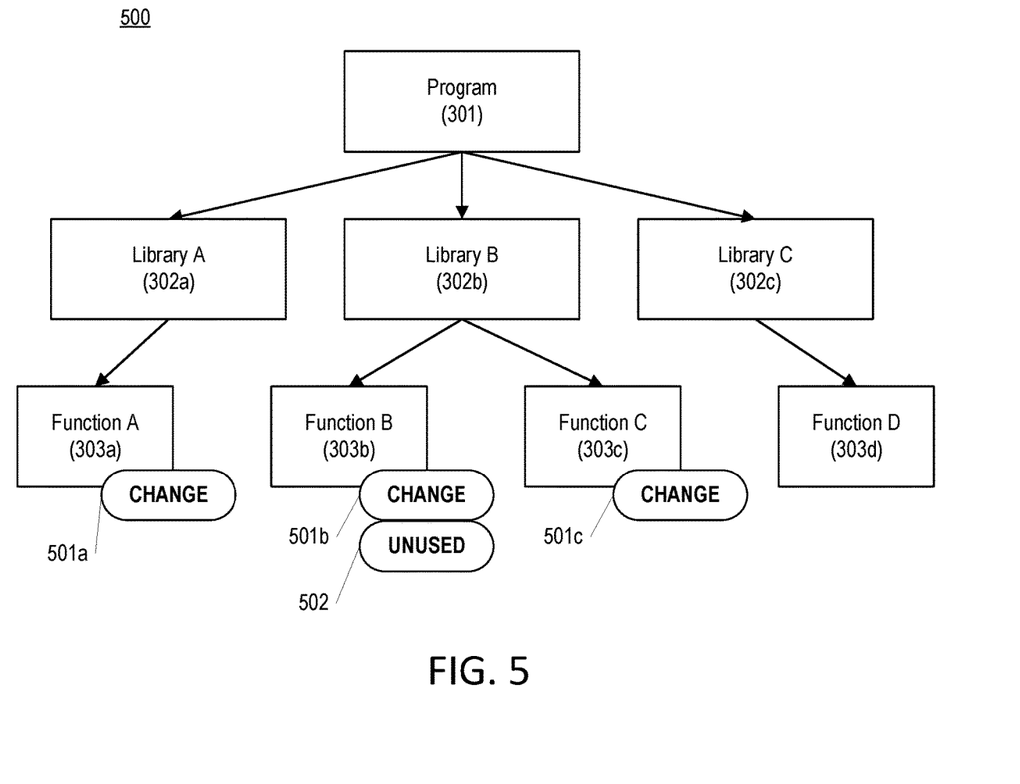
FIG. 5 shows a tree model for a program with library dependencies and differences to one or more functions according to one or more aspects of the disclosure.

As described with respect to step 409, a modified tree model may be output based on the differences between the first version of a library and a second version of the library. FIG. 5 depicts an example modified tree model 500 which may be generated based on the differences described in step 408 of FIG. 4. The program 301, the libraries 302a-302c, and the functions 303a-303d are the same as in the tree model 300 of FIG. 3. Change indicators 501a-501c have been added, which represent indications of the differences determined in step 508. As shown in FIG. 5, the function A 303a is indicated as having differences by change indicator 501a, the function B 303b is indicated as having differences by change indicator 501b, and the function C 303c is indicated as having differences by change indicator 501c. The change indicators may be more detailed: for example, the tree model may be displayed using a computing device, such that a user may click a change indicator and cause display of a report indicating details regarding the differences (e.g., a redline of differences between code of the first version of the library and code of the second version of the library). An unused indicator 502 is also shown. Though changes may occur with libraries, some changes may not have an impact on a program (e.g., the program 301) because they affect unused functions. For example, the program 301 might not be updated based on the change to the function B 303b as indicated by the change indicator 501b because the program 301 does not use the function B 303b.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
   determining, by a computing device, a first version of a library package, wherein the first version of the library package comprises a plurality of first program functions used during execution of program code;
   receiving, by the computing device, an update to the library package, wherein the update to the library package comprises a second program function that corresponds to a first program function of the plurality of first program functions;
   generating, by the computing device and based on a first code difference between the first program function and the second program function, one or more unit tests to test execution of the corresponding second program function;
   executing, by the computing device, the one or more unit tests to determine an impact, on execution of the program code, of the first code difference;
   generating, by the computing device, a tree model comprising:
      a plurality of child nodes, each corresponding to one of the plurality of first program functions used during execution of the program code;
      one or more parent nodes, each corresponding to at least one child node of the plurality of child nodes, that each represent a different file of the library package; and
      an indication, associated with at least one of the plurality of child nodes, of the impact of the first code difference; and
   causing, by the computing device, display of the tree model.

2. The method of claim 1, wherein the first code difference indicates that a first function name of the first program function is different than a second function name of the corresponding second program function.

3. The method of claim 1, wherein the first code difference indicates that a first quantity of input parameters of the first program function is different than a second quantity of input parameters of the corresponding second program function.

4. The method of claim 1, wherein the first code difference indicates that a first quantity of output parameters of the first program function is different than a second quantity of output parameters of the corresponding second program function.

5. The method of claim 1, wherein the first code difference indicates that code of the first program function is different than code of the corresponding second program function.

6. The method of claim 1, wherein the first code difference indicates that a first library file comprising the first program in the first version of the library package is different a second library file comprising the corresponding second program function in the update to the library package.

7. The method of claim 1, wherein determining the first code difference comprises determining that the first code difference is associated with one or more errors associated with execution of the program code.

8. The method of claim 1, wherein determining the first version of the library package comprising the plurality of first program functions comprises parsing at least a portion of the program code.

9. The method of claim 1, further comprising:
transmitting, by the computing device, to a second computing device, and based on the one or more unit tests, a notification of a failure.

10. The method of claim 1, further comprising:
updating, by the computing device and based on the first code difference, at least a portion of the program code.

11. An apparatus, comprising:
one or more processors; and
memory storing instructions that, when executed by the one or more processors, cause the apparatus to:
determine a first version of a library package, wherein the first version of the library package comprises a plurality of first program functions used during execution of program code;
receive an update to the library package, wherein the update to the library package comprises a second program function that corresponds to a first program function of the plurality of first program functions;
generate, based on a first code difference between the first program function and the second program function, one or more unit tests to test execution of the corresponding second program function;
execute the one or more unit tests to determine an impact, on execution of the program code, of the first code difference;
generate a tree model comprising:
a plurality of child nodes, each corresponding to one of the plurality of first program functions used during execution of the program code;
one or more parent nodes, each corresponding to at least one child node of the plurality of child nodes, that each represent a different file of the library package; and
an indication, associated with at least one of the plurality of child nodes, of the impact of the first code difference; and
cause display of the tree model.

12. The apparatus of claim 11, wherein the first code difference indicates that a first function name of the first program function is different than a second function name of the corresponding second program function.

13. The apparatus of claim 11, wherein the first code difference indicates that a first quantity of input parameters of the first program function is different than a second quantity of input parameters of the corresponding second program function.

14. The apparatus of claim 11, wherein the first code difference indicates that a first quantity of output parameters of the first program function is different than a second quantity of output parameters of the corresponding second program function.

15. The apparatus of claim 11, wherein the first code difference indicates that code of the first program function is different than code of the corresponding second program function.

16. The apparatus of claim 11, wherein the first code difference indicates that a first library file comprising the first program in the first version of the library package is different a second library file comprising the corresponding second program function in the update to the library package.

17. The apparatus of claim 11, wherein the instructions, when executed by the one or more processors, further cause the apparatus to:
notify, based on the one or more unit tests, a computing device of a failure.

18. A non-transitory machine-readable medium storing instructions that, when executed by one or more processors, cause the one or more processors to:
determine a first version of a library package, wherein the first version of the library package comprises a plurality of first program functions used during execution of program code;
receive an update to the library package, wherein the update to the library package comprises a second program function that corresponds to a first program function of the plurality of first program functions;
generate, based on a first code difference between the first program function and the second program function, one or more unit tests to test execution of the corresponding second program function;
execute the one or more unit tests to determine an impact, on execution of the program code, of the first code difference;
generate a tree model comprising:
a plurality of child nodes, each corresponding to one of the plurality of first program functions used during execution of the program code;
one or more parent nodes, each corresponding to at least one child node of the plurality of child nodes, that each represent a different file of the library package; and
an indication, associated with at least one of the plurality of child nodes, of the impact of the first code difference; and
cause display of the tree model.

19. The non-transitory machine-readable medium of claim 18, wherein the first code difference indicates that a first function name of the first program function is different than a second function name of the corresponding second program function.

20. The non-transitory machine-readable medium of claim 18, wherein the first code difference indicates that code of the first program function is different than code of the corresponding second program function.

* * * * *